United States Patent
Ault et al.

(10) Patent No.: US 6,289,432 B1
(45) Date of Patent: *Sep. 11, 2001

(54) SHARING SEGMENTS OF STORAGE BY ENABLING THE SHARING OF PAGE TABLES

(75) Inventors: Donald Fred Ault, Hyde Park; Harris M. Morgenstern, Wappingers Falls; Danny Ray Sutherland, Poughkeepsie, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,733

(22) Filed: Mar. 25, 1998

(51) Int. Cl.[7] .................................................. G06F 12/02
(52) U.S. Cl. ........................ 711/206; 711/147; 711/148; 711/220; 711/221
(58) Field of Search .................................. 711/148, 153, 711/206, 147, 220, 221

(56) References Cited

U.S. PATENT DOCUMENTS

| | | | |
|---|---|---|---|
| 4,991,082 | 2/1991 | Yoshizawa et al. | 364/200 |
| 5,008,811 | 4/1991 | Scalzi et al. | 364/200 |
| 5,053,951 | 10/1991 | Nusinov et al. | 364/200 |
| 5,117,350 | 5/1992 | Parrish et al. | 395/425 |
| 5,129,071 | 7/1992 | Yamagata et al. | 395/400 |
| 5,166,931 | 11/1992 | Riddle | 370/94.1 |
| 5,222,217 | 6/1993 | Blount et al. | 395/325 |
| 5,230,069 | 7/1993 | Brelsford et al. | 395/400 |
| 5,274,789 | 12/1993 | Costa et al. | 395/425 |
| 5,274,811 * | 12/1993 | Borg et al. | 395/704 |
| 5,341,341 | 8/1994 | Fukuzo | 365/233 |
| 5,341,500 | 8/1994 | Moyer et al. | 395/725 |
| 5,379,391 * | 1/1995 | Belsam et al. | 711/114 |
| 5,423,013 | 6/1995 | Baum et al. | 395/400 |
| 5,555,385 | 9/1996 | Osisek | 395/401 |
| 5,655,146 | 8/1997 | Baum et al. | 395/825 |
| 5,875,487 * | 2/1999 | Schwartz et al. | 711/202 |
| 6,085,296 * | 7/2000 | Karkhanis et al. | 711/147 |

OTHER PUBLICATIONS

"IBM Enterprise Systems Architecture/390 Principles of Operation," SA22–7201–04, Fifth Edition, Jun., 1997.

Vlckova, M., "Virtual Storage and Dynamic Address Translation—Simulation of Various Arrangements Of Three Three–And–A–Half Generation Computers," MECHANIZACE AUTOMATIZACE ADMINISTRATIVY, vol. 18, No. 11, pp. 414–417 (1978), Czechoslovakia (Abstract Only).

"Enhanced Dynamic Address Translation For Multi–Addressed Operands," International Business Machines Technical Disclosure Bulletin, vol. 36, No. 10, pp. 231–234 (Oct. 1993).

* cited by examiner

Primary Examiner—Hiep T. Nguyen
(74) Attorney, Agent, or Firm—William A. Kinnaman, Jr. Esq.; Heslin & Rothenberg, P.C.

(57) ABSTRACT

Segments of storage of a computer system are shared among any number of users at varying virtual addresses. The virtual addresses can be in the same address space or different address spaces. The sharing of a segment of storage is provided by storing the real address of a page table corresponding to the segment of storage to be shared at different virtual addresses. This allows users of the same or different address spaces to share the same segment of storage by referencing the same page table.

40 Claims, 5 Drawing Sheets

SHARING SEGMENTS OF STORAGE BY ENABLING THE SHARING OF PAGE TABLES

TECHNICAL FIELD

This invention relates, in general, to the sharing of storage and, in particular, to the sharing of a segment of storage among a plurality of users by storing the address of a page table, which corresponds to the segment of storage to be shared, at a plurality of virtual addresses.

BACKGROUND ART

The sharing of storage is an important aspect of many computer systems. Specifically, the ability to selectively control the data areas that are accessible to the units of work within the system is an essential function of an operating system. One operating system that allows a user to share pages of storage between address spaces and/or data spaces of the system is the OS/390 operating system, offered by International Business Machines Corporation. In particular, it is the IARVSERV service of OS/390 that provides this ability. IARVSERV is described in "MVS Programming: Authorized Assembler Services Reference", Volume 2, Document Number GC28-1765-03, which is hereby incorporated herein by reference in its entirety.

As another example, on UNIX systems, the mechanism used to create a shared memory segment is the shmget function in the C programming language. Servers then use the shmat C function to attach the shared memory to each of the clients. OS/390 UNIX System Services exploits the IARVSERV function to provide the shmget and shmat functions to UNIX applications on OS/390.

The sharing of storage comes at a high price, though. This is due to the fact that extra control structures are needed to keep track of the shared storage, which in turn necessitates the need for additional storage. Further, this high price can become exorbitant, especially when attempting to share large amounts of storage.

For example, the overhead associated with using a service, such as IARVSERV, to share a segment (e.g., 1 megabyte; 256 pages) of storage can be calculated as follows:

X MB*256 pages/MB*(Y+2) connections*32 bytes/page, where X is the number of megabytes being shared and Y is the number of address spaces connecting to the shared memory segment. The Y+2 accounts for the system overhead in tracking the shared segments. In a large server environment, it is possible to have X=500 Meg and Y represent 500 clients connecting to the server. In this sort of environment, the formula shows:

500 MB*256 pages/MB*(500+2) connections*32 bytes/page=2 Gig

In other words, it would consume 2 gigabytes of real storage to map this 500 Meg of virtual storage for 500 clients.

In addition to the above storage, there is also a need to account for the pages used for the page tables associated with the storage to be shared. Each page table consumes 4 k of real storage (assuming all clients are paged in) for each megabyte of shared memory. Thus, the overhead for the page table is:

X MB*4 Kbytes/MB*(Y+1) connections.

Plugging in 500 Meg for X and 500 for Y for the above example, shows that the page tables will consume an additional 1 gigabyte of real storage. Thus, three additional gigabytes of real storage would be needed in the above example. This need for such an exorbitant amount of additional storage has previously made the sharing of large amounts of storage unrealistic.

Based on the foregoing, a need exists for the ability to share large amounts of storage, without the overhead of additional control structures. Further, a need exists for the ability to share large amounts of storage without incurring exorbitant costs in terms of real storage. Yet further, a need exists for a capability that allows a client address space to attach to the same shared memory multiple times at different virtual addresses without incurring additional overhead.

SUMMARY OF THE INVENTION

The shortcomings of the prior art are overcome and additional advantages are provided through the provision of a method of sharing segments of storage of a computer system. In one embodiment, the method includes, for instance, obtaining, at a first address, a pointer to a page table corresponding to a segment of storage to be shared; and storing the pointer to the page table at a second address. The first address and the second address reference the same page table and therefore, the same segment of storage.

In a further embodiment of the invention, the pointer is stored at a plurality of addresses, such that the plurality of addresses reference the same page table.

In yet a further embodiment of the invention, the first address is located within a first address space and the second address is located within a second address space. In one example, the first and second address spaces are the same address spaces, while in another example, they are different address spaces.

In further embodiments of the invention, the first address and the second address are different virtual addresses, and the pointer is a real address of the page table.

In yet another embodiment of the invention, the method further includes determining the first address and/or the second address. As an example, the determining includes multiplying a given segment index by a length of a segment table entry, and adding that result to a beginning address of the segment table.

In another embodiment of the invention, a method of sharing segments of storage of a computer system is provided. The method includes, for instance, identifying a segment of storage to be shared; locating a source segment table entry corresponding to the segment of storage to be shared; retrieving a pointer to a page table associated with the segment of storage to be shared from the source segment table entry; determining a target segment table entry to receive the pointer; and storing the pointer in the target segment table entry, wherein the pointer to the page table is located within a plurality of segment table entries.

In another aspect of the present invention, a system of sharing segments of storage of a computer environment is provided. In one example, the system includes means for obtaining, at a first address, a pointer to a page table corresponding to a segment of storage to be shared; and means for storing the pointer to the page table at a second address, wherein the first address and the second address reference the same page table, and therefore, the same segment of storage.

In another example of the invention, the system includes means for storing the pointer at a plurality of addresses, wherein the plurality of addresses reference the same page table.

In another aspect of the present invention, a system of sharing segments of storage of a computer environment is provided. The system includes, for instance, means for identifying a segment of storage to be shared; means for locating a source segment table entry corresponding to the segment of storage to be shared; means for retrieving a pointer to a page table associated with the segment of storage to be shared from the source segment table entry; means for determining a target segment table entry to receive the pointer; and means for storing the pointer in the target segment table entry, wherein the pointer to the page table is located within a plurality of segment table entries.

In yet another aspect of the invention, an article of manufacture is provided. The article of manufacture includes at least one computer usable medium having computer readable program code means embodied therein for causing the sharing of segments of storage of a computer system. The computer readable program code means in the article of manufacture includes, for instance, computer readable program code means for causing a computer to obtain, at a first address, a pointer to a page table corresponding to a segment of storage to be shared; and computer readable program code means to cause a computer to store the pointer to the page table at a second address. The first address and the second address reference the same page table, and therefore, the same segment of storage.

In another aspect of the present invention, at least one program storage device readable by a machine tangibly embodying at least one program of instructions executable by the machine to perform a method of sharing segments of storage of a computer system is provided. The method includes, for instance, identifying a segment of storage to be shared; locating a source segment table entry corresponding to the segment of storage to be shared; retrieving a pointer to a page table associated with the segment of storage to be shared from the source segment table entry; determining a target segment table entry to receive the pointer; and storing the pointer in the target segment table entry, wherein the pointer to the page table is located within a plurality of segment table entries.

The present invention advantageously provides the ability to share large amounts of storage, without the overhead of additional control structures or the exorbitant cost of additional storage. Further, the present invention advantageously allows a user to attach to the same shared memory multiple times at different virtual addresses.

Additionally, the present invention raises the level of sharing from a page level to a segment level. It provides an efficient way of sharing whole segments of data among any number of user address spaces at varying user-specified virtual addresses. It advantageously allows the frame (e.g., a 4-kilobyte block of real storage) backing the page table to be shared between a data space and an address space, such that a segment of storage can be shared between the data space and the address space. It allows the shared segment to reside at any virtual address.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a capability is provided in which a segment of storage is shared among any number of address spaces at varying virtual addresses. In particular, the virtual addresses, which can be in one or more address spaces, are associated with a page table corresponding to the segment of storage to be shared. That is, all of the different virtual addresses that are to share the same segment of storage reference the same page table.

Figure 1:
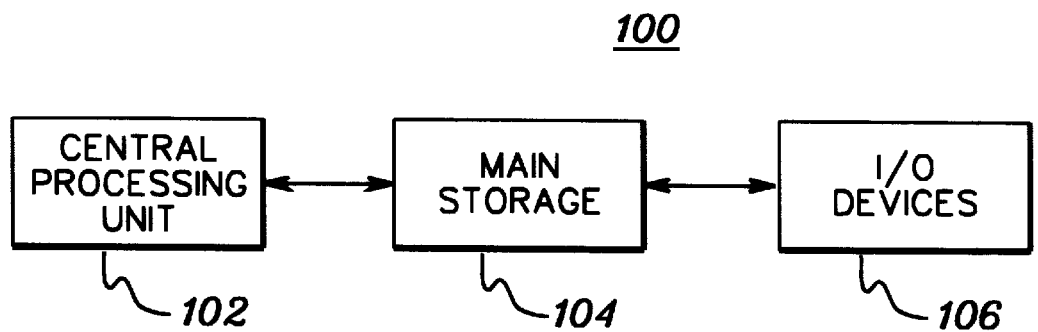
FIG. 1 depicts one embodiment of a computer environment incorporating and using the segment sharing capability of the present invention.

One example of a computer environment incorporating and using the segment level sharing capability of the present invention is described herein with reference to FIG. 1. A computer environment 100 includes, for instance, at least one central processing unit 102, a main storage 104 and one or more input/output devices 106, each of which is described below.

As is known, central processing unit 102 is the controlling center of computer environment 100 and provides the sequencing and processing facilities for instruction execution, interruption action, timing functions, initial program loading (IPL) and other machine related functions. The central processing unit executes at least one operating system, which as known, is used to control the operation of the computer environment by controlling the execution of other programs, controlling communication with peripheral devices and controlling use of the computer resources.

Central processing unit 102 is coupled to main storage 104, which is directly addressable and provides for high speed processing of data by the central processing unit. Main storage 104 may be either physically integrated with the central processing unit or constructed in stand alone units.

Main storage 104 is further coupled to one or more input/output devices 106. These devices include, for instance, key boards, communications controllers, teleprocessing devices, printers, magnetic storage media (e.g., tape, disks), direct access storage devices, and sensor based equipment. Data is transferred from main storage 104 to input/output devices 106, and from the input/output devices back to main storage.

Main storage 104 can appear larger than its actual configuration. This apparent main storage is referred to as virtual storage. The virtual storage available to a user may far exceed the size of main storage. The addresses used to designate locations in the virtual storage are referred to as virtual addresses. In one embodiment, a virtual address is 4 bytes long and is designated, as follows:

SSSPPDDD, where SSS is an index into a segment table, described below; PP is an index into a page table, described below; and DDD is a displacement into the data page of the data to be shared.

Virtual storage is considered to be composed of blocks of addresses, called pages. Only the most recently referred-to pages of virtual storage are assigned to occupy blocks of physical main storage. As a user refers to pages that do not appear in main storage, they are brought in to replace pages in main storage that are less likely to be needed. This swapping of pages of storage may be performed by the operating system without assistance by the user program.

In one example, computer environment 100 includes an ES/9000 computer system based on the Enterprise Systems Architecture (ESA)/390 offered by International Business Machines Corporation. ESA/390 is described in detail in Enterprise Systems Architecture/390 Principles of Operation, IBM Publication Number SA22-7201-04, Fifth Edition, June 1997, which is hereby incorporated herein by reference in its entirety. The operating system executed by the ES/9000 is, for instance, the Multiple Virtual Storage (MVS) or OS/390 operating system, also offered by International Business Machines Corporation.

Although an example of a computer environment is provided above, the invention is not limited to such an environment. The capabilities of the present invention can be incorporated and used with many types of computer environments. For instance, any computer environment that uses virtual storage or dynamic address translation, described below, can incorporate and use the principles of the present invention. Other variations are also possible.

In computer environments that support virtual storage, such as the one described above, main storage can be addressed by real or virtual addresses, and a sequence of virtual addresses is called an address space. A computer environment may include a number of address spaces. These address spaces may be used to provide a degree of isolation between users. As examples, each user can have its own address space, thus, providing complete isolation, or a shared area may be provided by mapping a portion of each address space to a single common storage area.

When a virtual address is used to access main storage, it is first translated into a real address by a facility known as dynamic address translation. Dynamic address translation is described in detail in the aforementioned Principles of Operation, which has been incorporated herein by reference in its entirety. Dynamic address translation recognizes two types of units of information: segments and pages. A segment is a block of sequential virtual addresses spanning, for instance, one megabyte of storage; and a page is a block of sequential virtual addresses spanning, for example, 4 k bytes of storage. Thus, in one embodiment, a segment of storage is 1 megabyte of storage, which includes 256 4 k-byte pages of storage. The pages of storage making up the segment can be in real and/or virtual storage.

During dynamic address translation, virtual addresses are translated into real addresses by using two translation tables: a segment table and a page table. These tables reflect the current assignment of real storage, and are described below.

Figure 2:
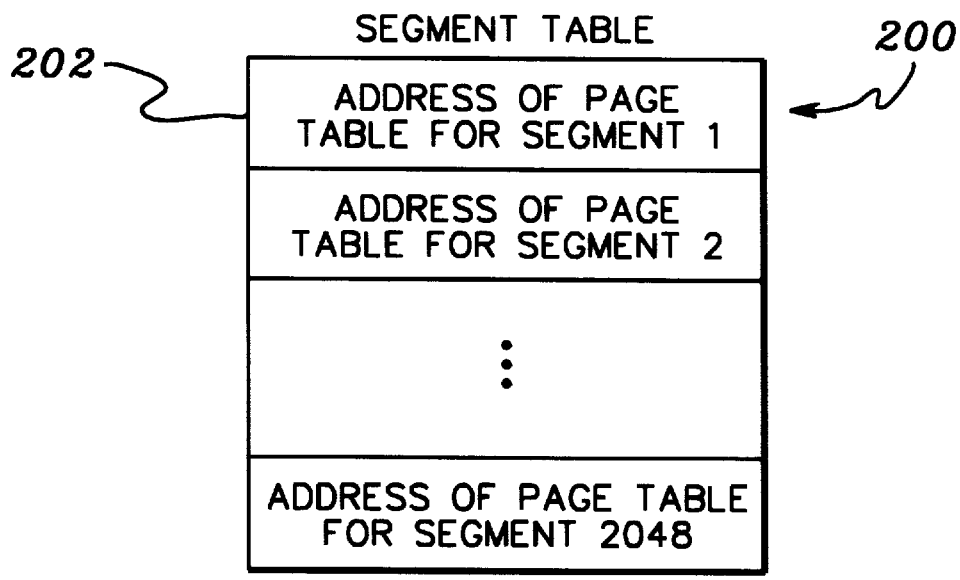
FIG. 2 depicts one example of a segment table used in accordance with the principles of the present invention.

A segment table 200 (FIG. 2) includes, for instance, an entry 202 for each segment of an address space. In one example, an address space includes 2048 segments and thus, segment table 200 includes 2048 entries. Each entry 202 is, for instance, 4 bytes long, and includes a pointer (e.g., a real address) to a page table corresponding to that segment. Each entry may also include additional information that need not be discussed for this particular invention.

Figure 3:
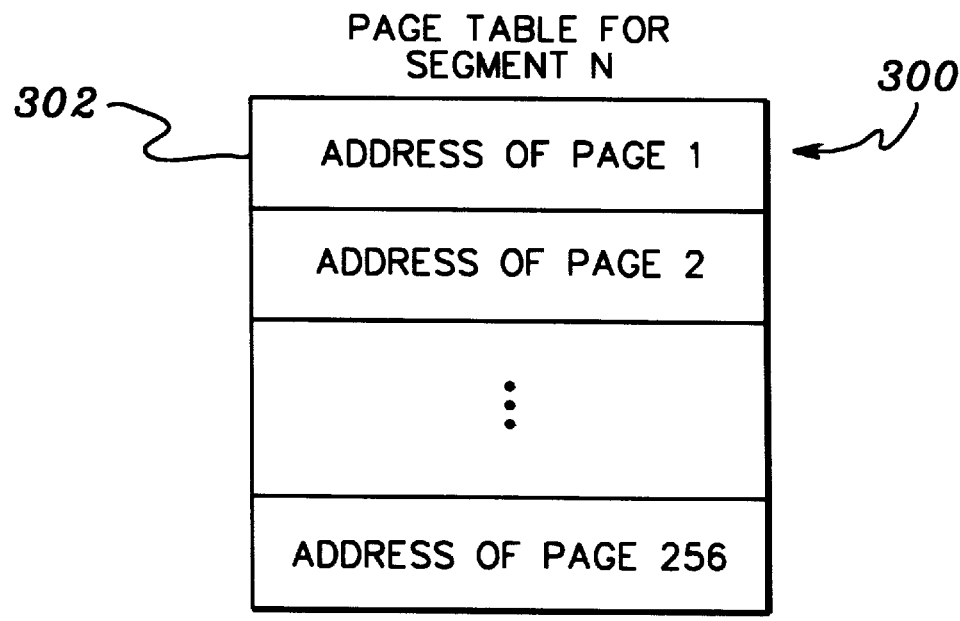
FIG. 3 depicts one embodiment of a page table used in accordance with the principles of the present invention.

Each segment of storage has a corresponding page table 300 (FIG. 3), which includes an entry 302 for each page of its corresponding segment. In one embodiment, each segment and thus, each page table, has 256 4 k pages of data associated therewith. Each entry 302 includes, for example, a pointer (e.g., a real address) to a data page of the corresponding segment. Each entry may also include other information that need not be discussed herein for this particular invention.

Figure 4:
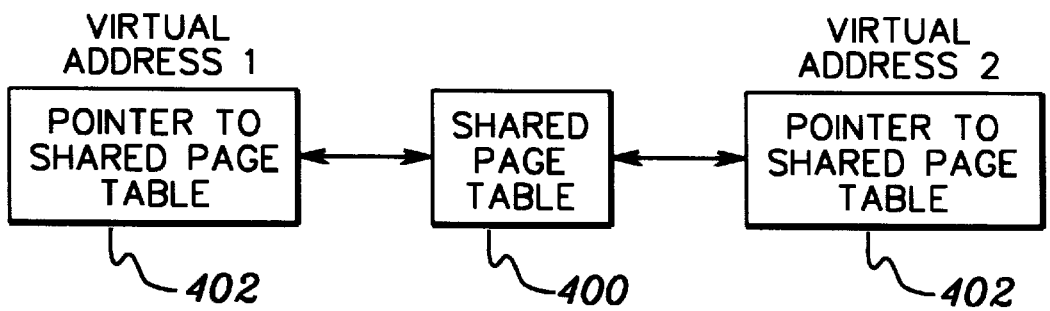
FIG. 4 illustrates two virtual addresses pointing to the same page table, in accordance with the principles of the present invention.

In accordance with the principles of the present invention, in order to provide segment level sharing, the page table corresponding to the segment of storage to be shared is also shared. That is, one page table 400 (FIG. 4) is referenced by different virtual addresses 402, as depicted in FIG. 4. Although only two addresses are shown in FIG. 4, the page table can be referenced by any number of virtual addresses, thus enabling the segment of storage to be shared by many users (e.g., applications). The virtual addresses can be within one address space or within a plurality of address spaces.

One embodiment of the logic used to provide segment level sharing is described in detail with reference to FIG. 5. A pictorial representation of the sharing is depicted in FIG. 6 and will also be referenced.

Figure 5:
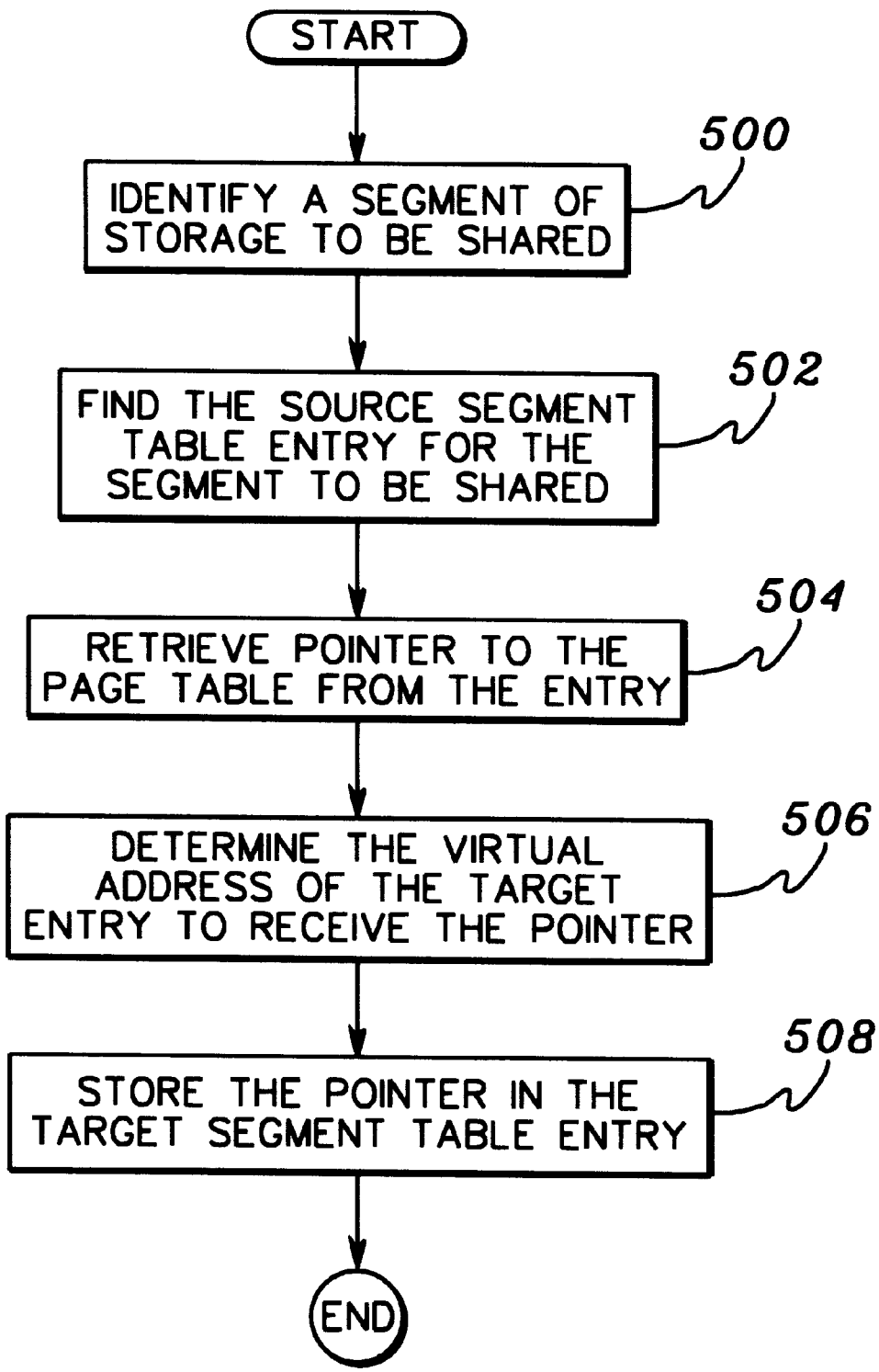
FIG. 5 depicts one example of the logic used to provide the two virtual addresses of FIG. 4 with the address of the same page table, in accordance with the principles of the present invention.
Figure 6:
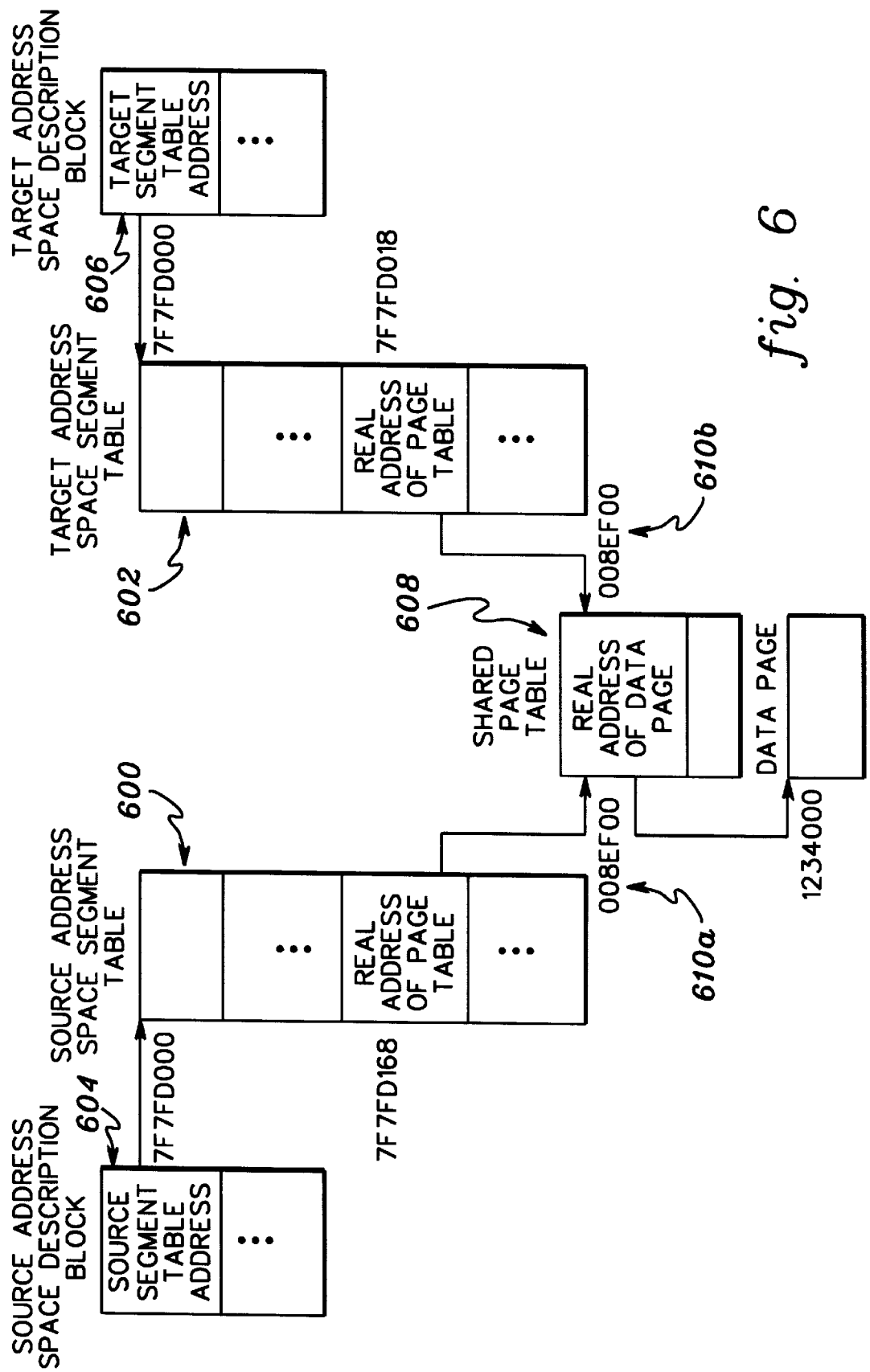
FIG. 6 is a more detailed example of different virtual addresses referencing and thus, sharing the same page table, in accordance with the principles of the present invention.

Referring to FIG. 5, initially, a segment of storage to be shared at different virtual addresses is identified, STEP 500. In one example, the identification is made within a request issued by a user (e.g., an application). The request may include the virtual addresses (or at least a portion of each of the addresses) to share the segment of storage. For instance, the user may indicate in a request that it wishes to share segment 05A (which is the segment index of a virtual address) of a source address space with segment 006 (another segment index) of a target address space. However, in another example, the virtual address could be defined by the operating system instead of by the user.

In the example described above and used herein, the source address space is the address space (e.g., a data space having persistent storage) that contains the data to be shared. It owns the source data for the shared segment. On the other hand, the target address space is an address space that is to share the segment of storage, and there may be multiple target address spaces.

The source address space has a source address space segment table 600 (FIG. 6) associated therewith, and similarly, the target address space has associated therewith a target address space segment table 602. A source address space description block 604 includes an address of the beginning of the source address space segment table (e.g., 7F7FD000), and a target address space description block 606 includes an address of the beginning of the target address space segment table (e.g., 7F7FD000). In this particular example, the segment tables begin at the same address, but this is not necessary.

Returning to FIG. 5, after a segment of storage to be shared is identified, the entry in source segment table 600 corresponding to the segment of storage to be shared (e.g., segment 05A) is located, STEP 502. In one example, the appropriate entry is located by multiplying the source segment index (e.g., 05A) by the length of the source segment table entry (e.g., 4), and adding the result to the beginning address of the source address space segment table (e.g., 7F7FD000). Thus, the appropriate entry of the source address space segment table corresponding to segment 05A is at virtual address 7F7FD168 (7F7FD000+(5A×4) in Hex) (see FIG. 6).

After determining that the proper entry is at virtual address 7F7FD168, the content of the entry at that address is retrieved, STEP 504 (FIG. 5). This content includes a pointer to page table 608, which corresponds to the segment of storage to be shared (e.g., segment 05A). In this particular example, the pointer is a real address 008EF00, as shown in FIG. 6 at 610a.

Subsequent to retrieving the pointer to the shared page table, the virtual address of the entry in target address space segment table 602 (FIG. 6) to receive the pointer is determined, STEP 506 (FIG. 5). In one embodiment, this virtual address is determined by multiplying the target segment index (e.g., 006) by the length of the target segment table entry (e.g., 4), and adding the result to the beginning address of table 602 (e.g., address 7F7FD000). Thus, the virtual address to share the segment of storage is 7F7FD018 (7F7FD000+(006×4) in Hex).

Thereafter, the pointer of shared page table 608 (FIG. 6) is stored at virtual address 7F7FD018, STEP 508. In this example, the pointer is real address 008EF00 (reference number 610b) of page table 608. Since page table 608 is pointed to or referenced by multiple virtual addresses (e.g., address 7F7FD168 and 7F7FD018), it is considered a shared page table. The sharing of the page table provides segment level sharing, in accordance with the principles of the present invention.

Figure 7:
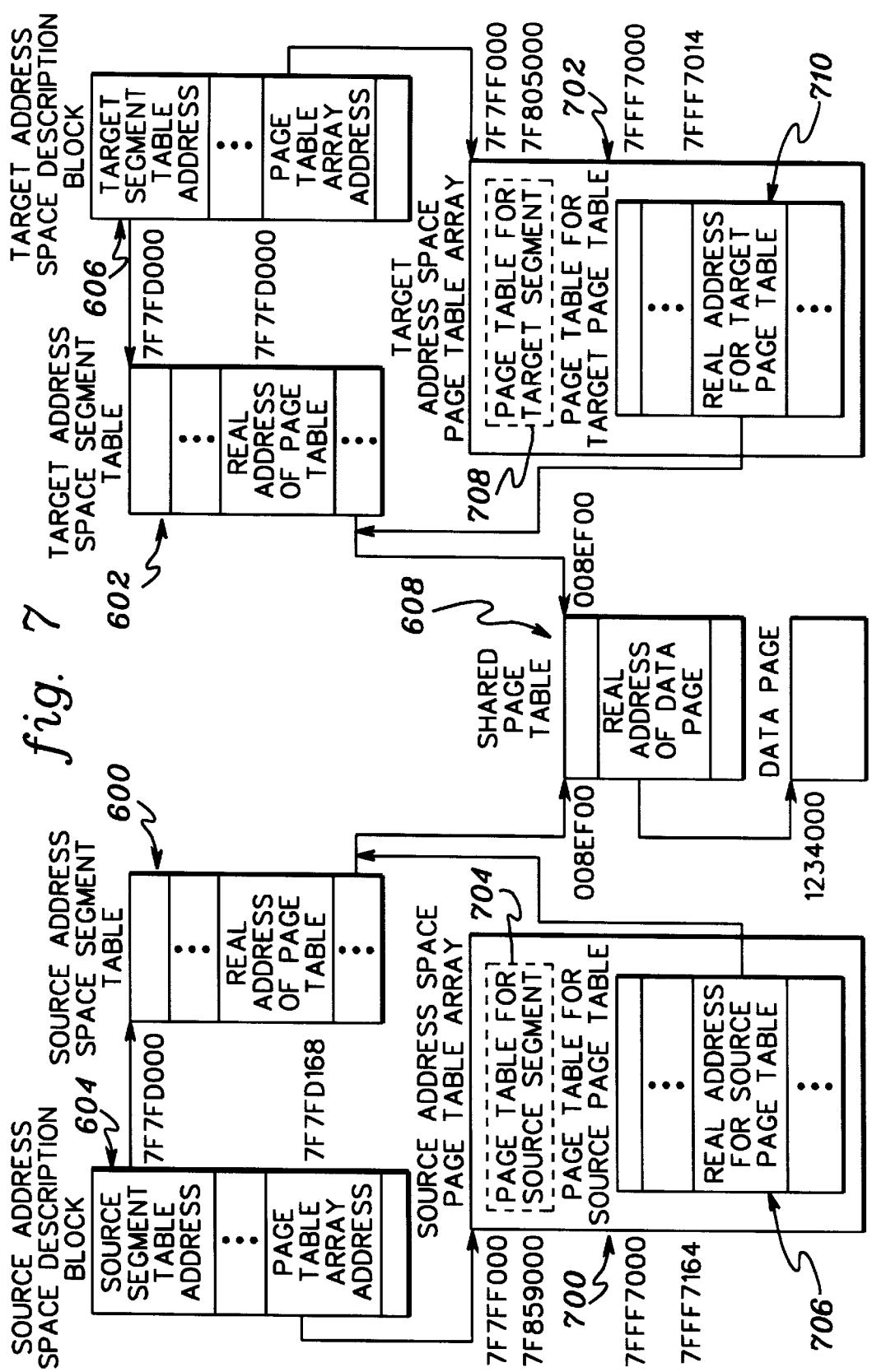
FIG. 7 shows further details of the example of FIG. 6, in accordance with the principles of the present invention.

In addition to the above, in one embodiment, each address space also has associated therewith a page table array, which includes a virtual page table for each segment of the address space. Thus, a source address space page table array 700 (FIG. 7) is associated with the source address space and a target address space page table array 702 is associated with the target address space. The beginning address of each page table array is stored in its corresponding address space description block 604, 606. In this particular example, each page table array has the same beginning address, 7F7FF000.

In this example, each page table in the array is 4 kilobytes in length, with the first 1024 bytes being 256 page table entries for the 256 pages in the segment represented by this page table, and the remaining 3072 bytes containing data not related to this invention.

Source address space page table array 700 includes, for instance, a virtual page table 704 for source segment 05A. This virtual page table corresponds to shared page table 608. In this particular example, the virtual page table is at virtual address 7F859000, which is obtained by multiplying the source segment index (e.g., 05A) by the size of a page table in hexadecimal (e.g., 4096=1000 Hex), and adding the result to the beginning address of array table 700 (e.g., 7F7FF000). Thus, 7F859000=(7F7FF000+(05A×1000) in Hex.

In addition to virtual page table 704, source address space page table array 700 includes a page table 706 for the source page table. Page table 706 allows shared page table 608 to be addressed in virtual storage.

In one example, the page table for the source page table begins at address 7FFF7000 and the entry of the page table corresponding to the source page table is at virtual address 7FFF7164. Virtual address 7FFF7164 is obtained by multiplying the page index of virtual address 7F859000 (e.g., 59) of page table 704 by the length of a page table entry (e.g., 4), and adding the result to the beginning address of page table 706 (e.g., 7FFF7000). Thus, 7FFF7164=(7FFF7000+ (59×4) in Hex. Stored within the entry at virtual address 7FFF7164 is the real address of shared page table 608.

In one embodiment, the real address of the shared page table is stored within page table 706, when the page table for segment 05A is brought into real memory through known paging techniques. It is at this time that the entry in source segment table 600 is also updated with the real address of the shared page table. This validates the segment table entry for the source address space.

Similar to the source address space page table array, target address space page table array 702 includes a virtual page table 708 for the target segment (e.g., segment 006), and a page table 710 for the target page table. Page table 710 includes the real address for the target page table, which is the same page table as the source page table. Page table 710 is updated when target address space segment table 602 is updated to point to shared page table 608. As with page table 706, page table 710 also allows shared page table 608 to be addressed in virtual storage.

In accordance with the principles of the present invention, when a shared segment of storage is released through, for instance, a STORAGE macro of OS/390, the sharing relationship is terminated. However, once a segment in the data space is shared, the frame (e.g., a 4-kilobyte block of real storage) backing its page table is fixed for the life of the IPL. Therefore, it is up to the application, for example, OS/390 UNIX System Services, to be a manager of these shared segments once they are no longer needed.

As an alternative embodiment, an application could return the frames backing the shared page tables when they are no longer needed. Further, a technique could be implemented, by which the frames backing the page tables for the shared segments could be paged out when there are no valid pages within the shared segment. By doing this, however, additional expenses would be incurred due to the keeping around of control data structures (although 1/256 of that required for page level sharing) needed to track the state and location of the page table.

The present invention advantageously eliminates the need for the 32 byte control blocks required to map the shared memory in page level sharing. In the example of 500 meg of shared memory and 500 clients, as described above, this represents a direct savings of 2 gigabytes of real storage. Since these client address spaces are sharing the page tables for the shared segments, there are only 501 page tables×4 k, or about 2 megabytes of real storage. This represents a savings of 998 megabytes. The total savings are nearly 3 gigabytes of real storage with the present invention. In reality, the 500 clients and 500 megabytes presents an impossible burden on the system with the old techniques. The new implementation allows far greater exploitation of shared memory.

The present invention advantageously allows the sharing of a page table and thus, the sharing of a segment of storage, by storing the real address of the page table at various virtual addresses. This enables the sharing of whole segments of data among any number of user address spaces at varying user-specified virtual addresses. The present invention is accomplished with low overhead without the need for additional data or control structures. The frame backing the page table is shared between the data space and an address space, such that a segment of storage can be shared between the data space and the address space. In one embodiment, the data space contains non-deletable storage. In accordance with the principles of the present invention, the shared segment can reside at any virtual address.

The present invention provides benefits, for example, when a page of real storage is to be reclaimed. With the present invention only one page table entry needs to be validated. There is no need for extra control blocks because the page is reclaimed from the source space.

The present invention can be included in an article of manufacture (e.g., one or more computer program products) having, for instance, computer useable media. The media has embodied therein, for instance, computer readable program code means for providing and facilitating the cap abilities o f the present invention. The article of manufacture can be included as a part of a computer system or sold separately.

Additionally, at least on e program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of sharing segments of storage of a computer system, said method comprising:
    obtaining, at a first segment table offset and a first address, a pointer to a page table corresponding to a segment of storage to be shared; and
    storing said pointer to said page table at a second segment table offset and a second address different from said first segment table offset and said first address,
    wherein said first address and said second address reference the same page table, and therefore, the same segment of storage.

2. The method of claim 1, wherein said segment of storage comprises a plurality of pages of storage.

3. The method of claim 1, wherein said first address is located within a first address space, and said second address is located within a second address space.

4. The method of claim 3, wherein said first address space and said second address space are different address spaces.

5. The method of claim 3, wherein said first address space and said second address space are the same address space.

6. The method of claim 3, wherein said first address space is a data space having persistent storage.

7. The method of claim 1, wherein said first address and said second address are different virtual addresses.

8. The method of claim 1, wherein said pointer is a real address of said page table.

9. The method of claim 1, further comprising determining at least one of said first address and said second address.

10. The method of claim 9, wherein said determining for either address comprises:
    multiplying a given segment index by a length of an entry of a segment table to obtain a result; and
    adding said result to a beginning address of said segment table.

11. The method of claim 1, wherein said first address corresponds to an entry of a source segment table, and wherein said entry contains said pointer.

12. The method of claim 1, wherein said second address corresponds to an entry of a target segment table, and wherein said storing comprises storing said pointer in said entry.

13. The method of claim 1, wherein said storing comprises storing said pointer at a plurality of addresses, wherein said plurality of addresses reference the same page table.

14. The method of claim 1, further comprising providing addressing to said page table in virtual storage.

15. The method of claim 13, wherein said providing uses at least one other page table that is associated with said page table.

16. A method of sharing segments of storage of a computer system, said method comprising:
    identifying a segment of storage to be shared;
    locating a source segment table entry corresponding to the segment of storage to be shared;
    retrieving a pointer to a page table associated with said segment of storage to be shared from said source segment table entry;
    determining a target segment table entry to receive said pointer; and
    storing said pointer in said target segment table entry, wherein said pointer to the page table is located within a plurality of segment table entries at different addresses and different segment table offsets.

17. The method of claim 16, wherein said pointer is a real address of said page table.

18. The method of claim 16, further comprising repeating said determining and said storing for other target segment table entries.

19. A system of sharing segments of storage of a computer environment, said system comprising:
    means for obtaining, at a first segment table offset and a first address, a pointer to a page table corresponding to a segment of storage to be shared; and
    means for storing said pointer to said page table at a second segment table offset and a second address different from said first segment table offset and said first address, wherein said first address and said second address reference the same page table, and therefore, the same segment of storage.

20. The system of claim 19, wherein said segment of storage comprises a plurality of pages of storage.

21. The system of claim 19, wherein said first address is located within a first address space, and said second address is located within a second address space.

22. The system of claim 19, wherein said first address and said second address are different virtual addresses.

23. The system of claim 19, wherein said pointer is a real address of said page table.

24. The system of claim 19, further comprising means for determining at least one of said first address and said second address.

25. The system of claim 24, wherein said means for determining for either address comprises:
    means for multiplying a given segment index by a length of an entry of a segment table to obtain a result; and
    means for adding said result to a beginning address of said segment table.

26. The system of claim 19, wherein said first address corresponds to an entry of a source segment table, and wherein said entry contains said pointer.

27. The system of claim 19, wherein said second address corresponds to an entry of a target segment table, and wherein said means for storing comprises means for storing said pointer in said entry.

28. The system of claim 19, wherein said means for storing comprises means for storing said pointer at a plurality of addresses, wherein said plurality of addresses reference the same page table.

29. The system of claim 19, further comprising means for providing addressing to said page table in virtual storage.

30. A system of sharing segments of storage of a computer environment, said system comprising:
- means for identifying a segment of storage to be shared;
- means for locating a source segment table entry corresponding to the segment of storage to be shared;
- means for retrieving a pointer to a page table associated with said segment of storage to be shared from said source segment table entry;
- means for determining a target segment table entry to receive said pointer; and
- means for storing said pointer in said target segment table entry, wherein said pointer to the page table is located within a plurality of segment table entries at different addresses and different segment table offsets.

31. The system of claim 30, wherein said pointer is a real address of said page table.

32. An article of manufacture, comprising:
- at least one computer useable medium having computer readable program code means embodied therein for causing the sharing of segments of storage of a computer system, the computer readable program code means in said article of manufacture comprising:
  - computer readable program code means for causing a computer to obtain, at a first segment table offset and a first address, a pointer to a page table corresponding to a segment of storage to be shared; and
  - computer readable program code means for causing a computer to store said pointer to said page table at a second segment table offset and a second address different from said first segment table offset and said first address, wherein said first address and said second address reference the same page table, and therefore, the same segment of storage.

33. The article of manufacture of claim 32, wherein said first address is located within a first address space, and said second address is located within a second address space.

34. The article of manufacture of claim 32, wherein said first address and said second address are different virtual addresses.

35. The article of manufacture of claim 32, wherein said pointer is a real address of said page table.

36. The article of manufacture of claim 32, further comprising computer readable program code means for causing a computer to determine at least one of said first address and said second address.

37. The article of manufacture of claim 32, wherein said computer readable program code means for causing a computer to store comprises computer readable program code means for causing a computer to store said pointer at a plurality of addresses, wherein said plurality of addresses reference the same page table.

38. The article of manufacture of claim 32, further comprising computer readable program code means for causing a computer to provide addressing to said page table in virtual storage.

39. At least one program storage device readable by a machine, tangibly embodying at least one program of instructions executable by the machine to perform a method of sharing segments of storage of a computer system, said method comprising:
- identifying a segment of storage to be shared;
- locating a source segment table entry corresponding to the segment of storage to be shared;
- retrieving a pointer to a page table associated with said segment of storage to be shared from said source segment table entry;
- determining a target segment table entry to receive said pointer; and
- storing said pointer in said target segment table entry, wherein said pointer to the page table is located within a plurality of segment table entries at different addresses and different segment table offsets.

40. The at least one program storage device of claim 39, wherein said pointer is a real address of said page table.

* * * * *